(No Model.)

J. M. KIRKPATRICK.
COMBINED FERTILIZER DISTRIBUTER AND WHEELBARROW.

No. 456,418. Patented July 21, 1891.

Witnesses
H. C. Gibson.
W. R. Davis.

Inventor
J. M. Kirkpatrick
By his Attorneys
Alexander & Davis

UNITED STATES PATENT OFFICE.

JAMES MONROE KIRKPATRICK, OF SMITHVILLE, MISSISSIPPI.

COMBINED FERTILIZER-DISTRIBUTER AND WHEELBARROW.

SPECIFICATION forming part of Letters Patent No. 456,418, dated July 21, 1891.

Application filed April 13, 1891. Serial No. 388,638. (No model.)

*To all whom it may concern:*

Be it known that I, JAMES MONROE KIRKPATRICK, a citizen of the United States, residing at Smithville, in the county of Monroe and State of Mississippi, have invented certain new and useful Improvements in a Combined Fertilizer-Distributer and Wheelbarrow, of which the following is a specification, reference being had therein to the accompanying drawings, in which—

Figure 1:
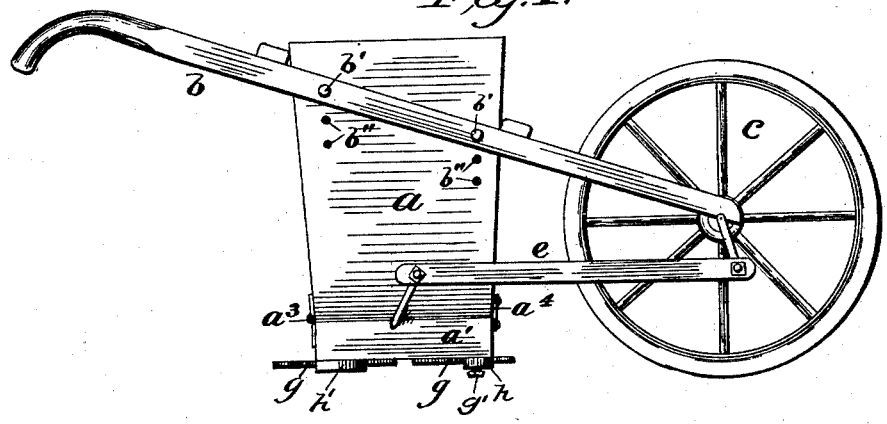
Figures 2, 4:
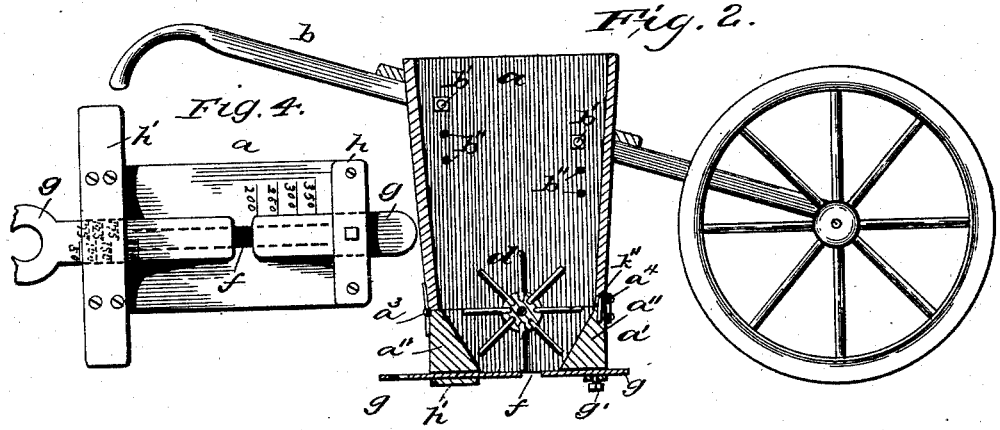
Figures 3, 5:
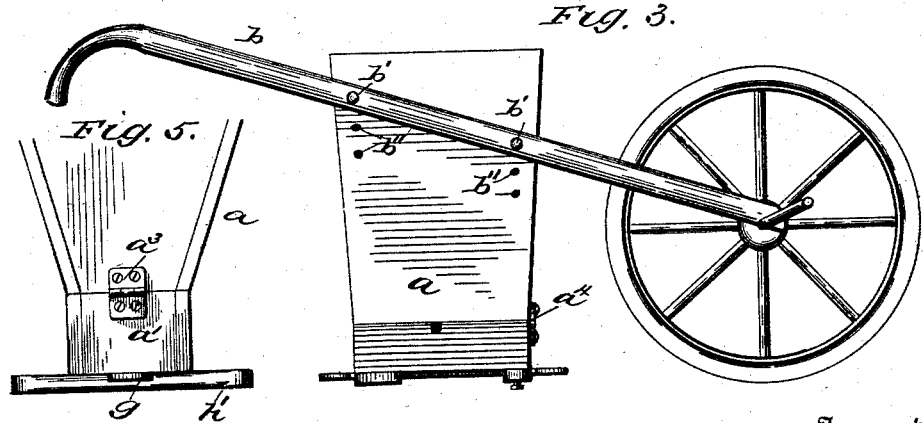

Figure 1 represents a side elevation of my improved combined distributer and wheelbarrow as it appears when adjusted for distributing fertilizer; Fig. 2, a longitudinal vertical sectional view of the same; Fig. 3, a side elevation of the machine arranged for use as a wheelbarrow; Fig. 4, a detail bottom view of the hopper, showing more clearly the manner of regulating the feed-opening; and Fig. 5, a rear elevation of the lower end of the hopper.

The nature and objects of the invention will fully appear in the course of this specification; and it consists of certain new and useful combinations of parts, that will be particularly pointed in the claim appended.

In the drawings, $a$ designates a depending hopper supported between a pair of upwardly-inclined handles $b\ b$, which have journaled between their foward lower ends a transporting-wheel $c$, the axle of this wheel being journaled upon the under sides of the handle-beams. Journaled in the lower end of the hopper and extending transversely thereof is a horizontal shaft carrying a spiked stirring and feeding wheel $d$, which is rocked or oscillated by means of a pitman $e$, connecting a crank formed on its shaft to a crank formed on the axle of the front wheel, motion being imparted by the traction of the wheel in advancing. The lower portion $a'$ of the hopper is divided from the upper main portion and is connected thereto at its rear side by a hinge $a^3$ and at its front side by a detachable hook or catch $a^4$, the shaft of the stirrer-wheel being journaled in the side of the hopper between this lower movable section and upper stationary portion. Thus hinging the lower section to the upper section on a line with the stirrer-shaft enables that shaft and its wheel to be readily removed for the purposes of repair and cleaning and converting the machine into a garden-wheelbarrow. When the machine is employed as a wheelbarrow, the pitman is removably attached to the stirrer-wheel, the nut in the front crank enabling this to be done. This manner of hinging the lower section of the hopper in order that it may be unhooked and thrown back also renders the parts of the machine easier to construct and put together.

In order that the hopper may be adjusted vertically between the handles to accommodate different-sized operators, an extra series of bolt-holes $b''$ is formed in the sides of the hopper in line with and below the connecting-bolts $b'$, that pass through the handles and sides of the hopper. To raise the hopper it is simply necessary to remove the connecting-bolts and lower the handles until the holes of the lower series register with the holes in the handles and then replace the bolts, as is evident. The end blocks $a''$ in the bottom of the hopper are inclined downwardly and inwardly, so as to direct the fertilizer when the stirrer is operated toward a longitudinal slot $f$ in the bottom of the hopper, this slot extending from a bar $h$, secured across the front end of the bottom, to a bar $h'$, extending across the rear end thereof. Gages or slides $g\ g$ are arranged between the cross-bars $h\ h'$ and the bottom of the hopper, these gages being adapted to be readily adjusted endwise with respect to each other, so as to close all or any portion of the slot or opening, as may be desired. The front gage is positively but adjustably held by means of a set-screw $g'$, screwed into the front cross-bar $h$, and the rear gage is simply held by friction in any desired position.

Suitable indicating graduating-marks are placed upon the slides or the bottom of the hopper, as shown, in order that the number of pounds of fertilizer distributed per acre may be regulated. The indicating-marks are preferably placed upon the upper side of the rear slide in order that the operator may at all times know what amount the machine is set to distribute without stopping the machine. When the machine is employed as a wheelbarrow, and also when being moved from place to place, the slides are adjusted so as to entirely close the feed-opening, as is evident. The rear cross-bar $h'$ has its ends extended out laterally to afford a broad bearing for the hopper when the machine is at rest, and thereby prevent it tilting over.

This machine is very simple and durable in construction and is so light that it requires but little effort to push it over the ground. Its main advantage, however, is its capability of being readily converted from a distributer into a garden-wheelbarrow, whereby it may be made to serve the purpose of two very useful farm implements.

Another feature of advantage is the adjustable gages, the rear one of which extends out rearwardly from the hopper a suitable distance to be within easy reach of the foot of the operator, so that he may cut off the feed at any point without stopping the machine, thereby enabling him to prevent all waste of the fertilizer.

A dowel-pin K″ may be secured in one of the sections of the hopper and adapted to enter a recess in the other section to assist in keeping the sides of the sections in alignment.

Having thus fully described my invention, what I claim, and desire to secure by Letters Patent, is—

In a convertible fertilizer-distributer and garden-wheelbarrow, the combination of a frame, a wheel journaled on the same, an adjustable hopper depending from the frame and open at its lower end, a supplemental section of hopper $a'$ approximately the shape of and being hinged to the lower end of the hopper, this section having interior inclines leading to a slot in its bottom, adjustable slides closing this opening, a removable stirrer-wheel working in the hopper and having its shaft working between the same and the lower section, and removable means for operating this stirrer, substantially as described.

In testimony whereof I affix my signature in presence of two witnesses.

J. MONROE KIRKPATRICK.

Witnesses:
T. B. BURDINE,
W. L. BOORLAND.